(12) United States Patent
Chaudhury et al.

(10) Patent No.: US 11,468,334 B2
(45) Date of Patent: Oct. 11, 2022

(54) CLOSED LOOP MODEL-BASED ACTION LEARNING WITH MODEL-FREE INVERSE REINFORCEMENT LEARNING

(71) Applicant: INTERNATIONAL BUSINESS MACHINES CORPORATION, Armonk, NY (US)

(72) Inventors: Subhajit Chaudhury, Kawasaki (JP); Daiki Kimura, Tokyo (JP); Tadanobu Inoue, Yokohama (JP); Ryuki Tachibana, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1126 days.

(21) Appl. No.: 16/012,229

(22) Filed: Jun. 19, 2018

(65) Prior Publication Data
US 2019/0385061 A1    Dec. 19, 2019

(51) Int. Cl.
*G06N 3/08*    (2006.01)
*G06N 3/04*    (2006.01)

(52) U.S. Cl.
CPC ............ *G06N 3/084* (2013.01); *G06N 3/049* (2013.01); *G06N 3/0472* (2013.01); *G06N 3/0481* (2013.01)

(58) Field of Classification Search
CPC .... G06N 3/006; G06N 3/0445; G06N 3/0472; G06N 3/0481; G06N 3/049; G06N 3/084; G06N 7/005
See application file for complete search history.

(56) References Cited

U.S. PATENT DOCUMENTS

| | | |
|---|---|---|
| 7,107,107 B2 | 9/2006 | Morikawa et al. |
| 2017/0228662 A1 | 8/2017 | Gu et al. |
| 2018/0012137 A1 | 1/2018 | Wright et al. |
| 2018/0165603 A1* | 6/2018 | Van Seijen ............ G06N 3/084 |
| 2020/0218999 A1* | 7/2020 | Eleftheriadis .......... G06Q 10/04 |

OTHER PUBLICATIONS

Kimura et al., "Reward Estimation via State Prediction", Feb. 15, 2018, ICLR 2018 Conference Blind Submission, pp. 1-14 (Year: 2018).*

(Continued)

*Primary Examiner* — Brent Johnston Hoover
(74) *Attorney, Agent, or Firm* — Tutunjian & Bitetto, P.C.; Randall Bluestone

(57) ABSTRACT

A computer-implemented method is provided for learning an action policy. The method includes obtaining, by a processor, environment dynamics including triplets of a state, an action, and a next state. The state in each of the triplets is an expert state. The method further includes training, by the processor using the environment dynamics as training data, a dynamics model which obtains a pair of the state and the action as an input and outputs, for each next state, state-transition probabilities. The method also includes learning, by the processor, the action policy using trajectories of expert states according to a supervised learning technique by back-propagating error gradients through the trained dynamics model.

20 Claims, 11 Drawing Sheets

(56) References Cited

OTHER PUBLICATIONS

Englert et al., "Model-based Imitation Learning by Probabilistic Trajectory Matching", May 10, 2013, 2013 IEEE International Conference on Robotics and Automation (ICRA), pp. 1922-1927 (Year: 2013).*

Boularias et al., "Relative Entropy Inverse Reinforcement Learning", 2011, Proceedings of the 14th International Conference on Artificial Intelligence and Statistics (AISTATS) 2011, pp. 182-189 (Year: 2011).*

Torabi et al., "Behavioral Cloning from Observation", May 11, 2018, Proceedings of the 27th International Joint Conference on Artificial Intelligence, pp. 1-8 (Year: 2018).*

Uchibe et al., "Inverse Reinforcement Learning Using Dynamic Policy Programming", Oct. 16, 2014, 2014 Joint IEEE International Conferences on Development and Learning and Epigenetic Robotics, pp. 222-228 (Year: 2014).*

Kimura, et al., "Reward Estimation via State Prediction", Feb. 15, 2018, https://webcache.googleusercontent.com/search?q=cache:AN8SCJywKcsJ:https://openreview.net/forum%3Fid%3DHktXuGb0-+&cd=2&hl=en&ct=clnk&gl=us. (Year: 2018).*

Anonymous et al., "Reward Estimation Via State Prediction", ICLR2018, Apr. 2018, pp. 1-14.

Anonymous et al., "Model-Based Imitation Learning From State Trajectories", ICLR2018, Apr. 2018, pp. 1-11.

Duan et al., "One-Shot Imitation Learning", 31st Conference on Neural Information Processing Systems (NIPS 2017), Dec. 2017, pp. 1-12.

Ho et al., "Generative Adversarial Imitation Learning", 30th Conference on Neural Information Processing Systems (NIPS 2016), Dec. 2016, pp. 1-9.

Nagabandi et al., "Neural Network Dynamics for Model-Based Deep Reinforcement Learning with Model-Free Fine-Tuning", arXiv:1708.02596v2 [cs.LG] Dec. 2, 2017, 10 pages.

Ng et al., "Algorithms for Inverse Reinforcement Learning", ICML '00 Proceedings of the Seventeenth International Conference on Machine Learning, Jul. 2000, 8 pages.

Pomerleau, Dean A., "Efficient Training of Artificial Neural Networks for Autonomous Navigation", Neural Computation 1991, Jun. 1991, pp. 88-97.

Wang et al., "Robust Imitation of Diverse Behaviors", 31st Conference on Neural Information Processing Systems (NIPS 2017), Dec. 2017, pp. 1-10.

Ziebart et al., "Maximum Entropy Inverse Reinforcement Learning", Proceedings of the Twenty-Third AAAI Conference on Artificial Intelligence, Jul. 2008, pp. 1434-1438.

\* cited by examiner

CLOSED LOOP MODEL-BASED ACTION LEARNING WITH MODEL-FREE INVERSE REINFORCEMENT LEARNING

BACKGROUND

Technical Field

The present invention generally relates to machine learning, and more particularly to closed loop model-based action learning with model-free inverse reinforcement learning.

Description of the Related Art

Reinforcement learning often involves the problem of imitation learning from trajectories of states only (that is, the action information is missing/unavailable). However, without use of the action information, the reinforcement learning is adversely affected in terms of accuracy, computational expense, and so forth. Hence, there is a need for a technique for machine learning that is capable of accurately and efficiently learning from only state trajectories.

SUMMARY

According to an aspect of the present invention, a computer-implemented method is provided for learning an action policy. The method includes obtaining, by a processor, environment dynamics including triplets of a state, an action, and a next state. The state in each of the triplets is an expert state. The method further includes training, by the processor using the environment dynamics as training data, a dynamics model which obtains a pair of the state and the action as an input and outputs, for each next state, state-transition probabilities. The method also includes learning, by the processor, the action policy using trajectories of expert states according to a supervised learning technique by back-propagating error gradients through the trained dynamics model.

According to another aspect of the present invention, a computer program product is provided for learning an action policy. The computer program product includes a non-transitory computer readable storage medium having program instructions embodied therewith. The program instructions are executable by a computer to cause the computer to perform a method. The method includes obtaining, by a processor of the computer, environment dynamics including triplets of a state, an action, and a next state. The state in each of the triplets is an expert state. The method further includes training, by the processor using the environment dynamics as training data, a dynamics model which obtains a pair of the state and the action as an input and outputs, for each next state, state-transition probabilities. The method also includes learning, by the processor, the action policy using trajectories of expert states according to a supervised learning technique by back-propagating error gradients through the trained dynamics model.

According to yet another aspect of the present invention, a computer processing system is provided for learning an action policy. The computer processing system includes a memory for storing program code. The computer processing system further includes a processor, operatively coupled to the memory, for running the program code to obtain environment dynamics including triplets of a state, an action, and a next state. The state in each of the triplets is an expert state. The processor further runs the program code to train, using the environment dynamics as training data, a dynamics model which obtains a pair of the state and the action as an input and outputs, for each next state, state-transition probabilities. The processor also runs the program code to learn the action policy using trajectories of expert states according to a supervised learning technique by back-propagating error gradients through the trained dynamics model.

According to still another aspect of the present invention, a computer-implemented method is provided for learning an action policy. The method includes learning, by a processor, a predictor which predicts a next state using trajectories of expert states. The method further includes performing, by the processor, model-free inverse reinforcement learning using rewards estimated by using the predictor to sample environment dynamics including triplets of a state, an action, and a next state. The state in each of the triplets is an expert state. The method also includes training, by the processor using the sampled environment dynamics as training data, a dynamics model which obtains a pair of the state and the action as an input and outputs, for each next state, state-transition probabilities to provide a trained dynamics model.

According to a further aspect of the present invention, a computer processing system is provided for learning an action policy. The computer processing system includes a memory for storing program code. The computer processing system further includes a processor, operatively coupled to the memory, for running the program code to learn a predictor which predicts a next state using trajectories of expert states. The processor further runs the program code to perform model-free inverse reinforcement learning using rewards estimated by using the predictor to sample environment dynamics including triplets of a state, an action, and a next state. The state in each of the triplets is an expert state. The processor also runs the program code to train, using the sampled environment dynamics as training data, a dynamics model which obtains a pair of the state and the action as an input and outputs, for each next state, state-transition probabilities to provide a trained dynamics model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to closed loop model-based action learning with model-free inverse reinforcement learning. As used herein, the term "closed loop model-based action learning" refers to the combination of the model-free standard reinforcement learning for extracting the trajectories from the current policy and model-based action learning using behavior cloning that learns actions in a supervised manner from state and action pairs.

In an embodiment, the present invention provides an approach for learning the optimal policy from optimal demonstration data that includes only optimal states and not actions. To that end, the present invention learns the next state predictor, from the optimal state trajectory data, using a Long Short-Term Memory (LSTM) or Dynamic Boltzmann Machine (DyBM) to predict the next state. The training of an agent is commenced in a closed-loop manner. In the training of the agent, the following steps can be repeated until convergence is reached or a number of performed steps is reached that is less than a threshold (e.g., max_steps): (a) start a model-free update using an estimated reward function computed from inverse reinforcement learning; (b) start gathering state, action, and next state triplets during the model-free exploration and periodically train the dynamics model; and (c) fix the dynamic model weights and train end-to-end using expert demonstration data.

Figure 1:
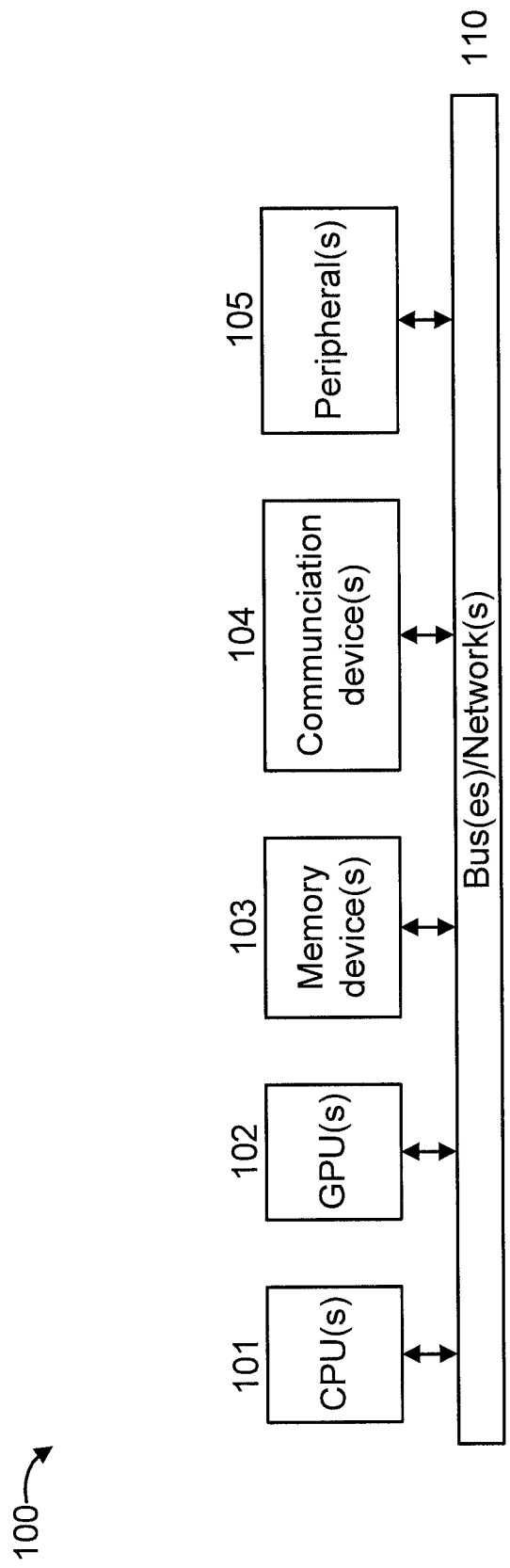
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 9-10). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Herein, reference is made to a "policy" aka an "action policy" as an element in various figures. In such cases, the terms "policy" and "action policy" refer to map that models action selection by an agent given various states. Hence, policy refers to a map or mapping of actions for selection (e.g., a probability of taking action a when in state s), and may be also denoted herein by the symbol 7C. That is, a policy is a tuple of mappings from the set of states S to the set of actions A, with one mapping for each time step. The term "$\pi_{mb}$" herein refers to a model-based policy. The term "$\pi_{mf}$" herein refers to a model-free policy.

A description will now be given regarding model-based imitation learning from state trajectories, in accordance with an embodiment of the present invention.

To that end, a problem formulation is now described.

The problem formulation involves (1) maximizing the log-likelihood of trajectories, (2) framing the problem (of learning from trajectories of states only, that is, the action information is missing/unavailable) as an encoder-decoder network, and (3) constraining the decoder to be a dynamics model.

Figure 2:
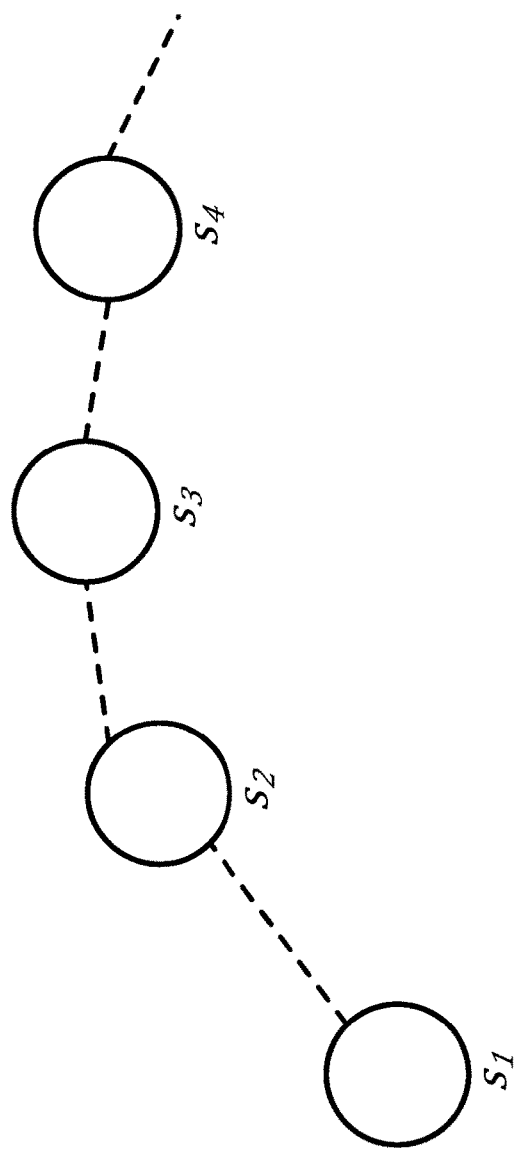
FIG. 2 is a block diagram showing exemplary expert trajectories to which the present invention can be applied, in accordance with an embodiment of the present invention.

Regarding (1) maximizing the log-likelihood of trajectories, the same can be achieved as follows:

$$\theta^* = \text{argmin}\left[-\sum_{j=1}^{n}\sum_{t=1}^{T} \log p(s_{t+1} \mid s_{1:t}; \theta)\right]$$

where $s_t$ denotes an agent state (hereinafter "state" in short), p denotes a transition probability (of transitioning from state $s_t$ to state $s_{t+1}$), θ denotes a parameter vector, and T denotes the number of steps in each episode and n denotes the number of episodes used for training. FIG. 2 is a block diagram showing exemplary expert trajectories 200 to which the present invention can be applied, in accordance with an embodiment of the present invention. The expert trajectories 200 involve states $s_1$, $s_2$, $s_3$, and $s_4$.

Regarding (2) framing the problem as an encoder-decoder network, the same can be achieved as follows:

$$\mathcal{L}_{sas} = -\sum_{j=1}^{m}\sum_{t=1}^{T} \log \int_a p(s_{t+1} \mid s_t, a; \theta_d) p(a \mid s_t; \theta_e) da$$

where a denotes an action, $s_t$ denotes an agent's current state, $p(s_{t+1}|s_t, a; \theta_d)$ denotes a transition probability which forms the decoder (of transitioning from state $s_t$ to state $s_{t+1}$), $\theta_d$ denotes a parameter vector for the decoder, $p(a|s_t; \theta_e)$ denotes the action policy which forms the encoder, $\theta_e$ denotes a parameter vector for the encoder and T denotes the number of steps in each episode and m denotes the number of episodes used for training.

Figure 3:
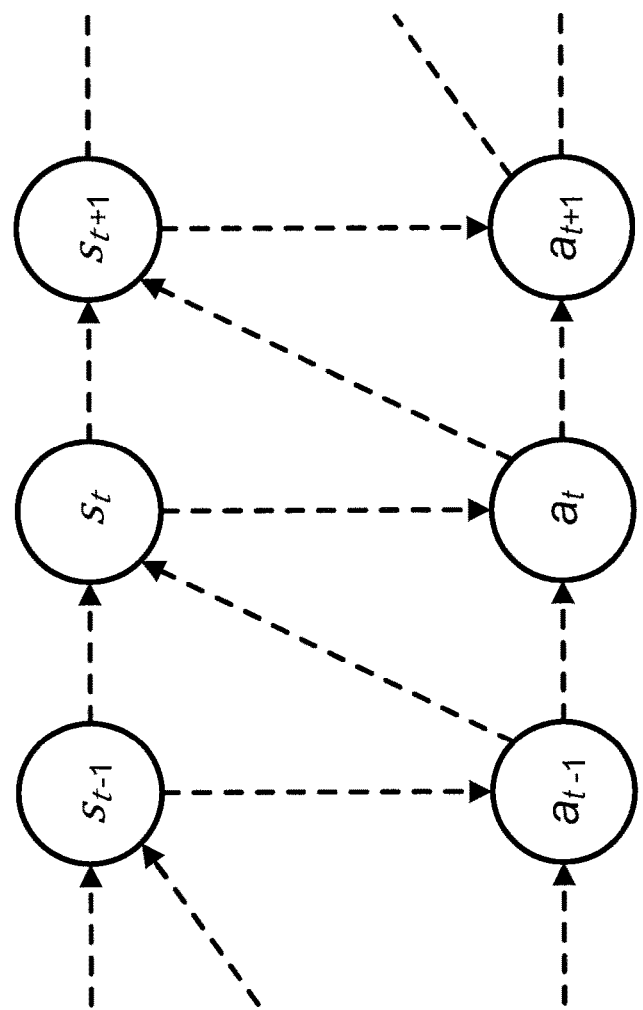
FIG. 3 is a block diagram showing an exemplary directed graphical model to which the present invention can be applied, in accordance with an embodiment of the present invention.

Regarding (3) constraining the decoder ($p(s_{t+1}|s_t, a; \theta_d)$) to be a dynamics model, the same can be achieved as follows:

$$\mathcal{L}_{proposed} = -\mathbb{E}_{(s_t, s_{t+1}) \sim \mathcal{T}_E} (\log \int_a p(s_{t+1}|s_t, a; \theta_{dyn}) p(a|s_t, \theta_{mb}) da) - \mathbb{E}_{(s_t, a_t, s_{t+1}) \sim \mathcal{T}_{RL}} (\log p(s_{t+1}|s_t, a_t; \theta_{dyn}))$$

where the variables denote same symbols as above, with $\mathcal{T}_E$ as the expert trajectory, $\mathcal{T}_{RL}$ as the sampled trajectories from the current policy, $\theta_{mb}$ is the parameter vector for the current policy and $\theta_{dyn}$ is the parameter vector for the dynamics model. FIG. 3 is a block diagram showing an exemplary directed graphical model 300 to which the present invention can be applied, in accordance with an embodiment of the present invention. The directed graphical model 300 involves states $s_{t-1}$, $s_t$, and $s_{t+1}$, and actions $a_{t-1}$, $a_t$, and $a_{t+1}$.

A significant aspect of the present invention is combining of dynamics model with policy learning. The combination of a dynamics model to obtain policy gradients directly from expert data is a significant improvement over prior art approaches. The dynamics model is a set of probability distributions for predicting a next state given a current state and action pair.

Figure 4:
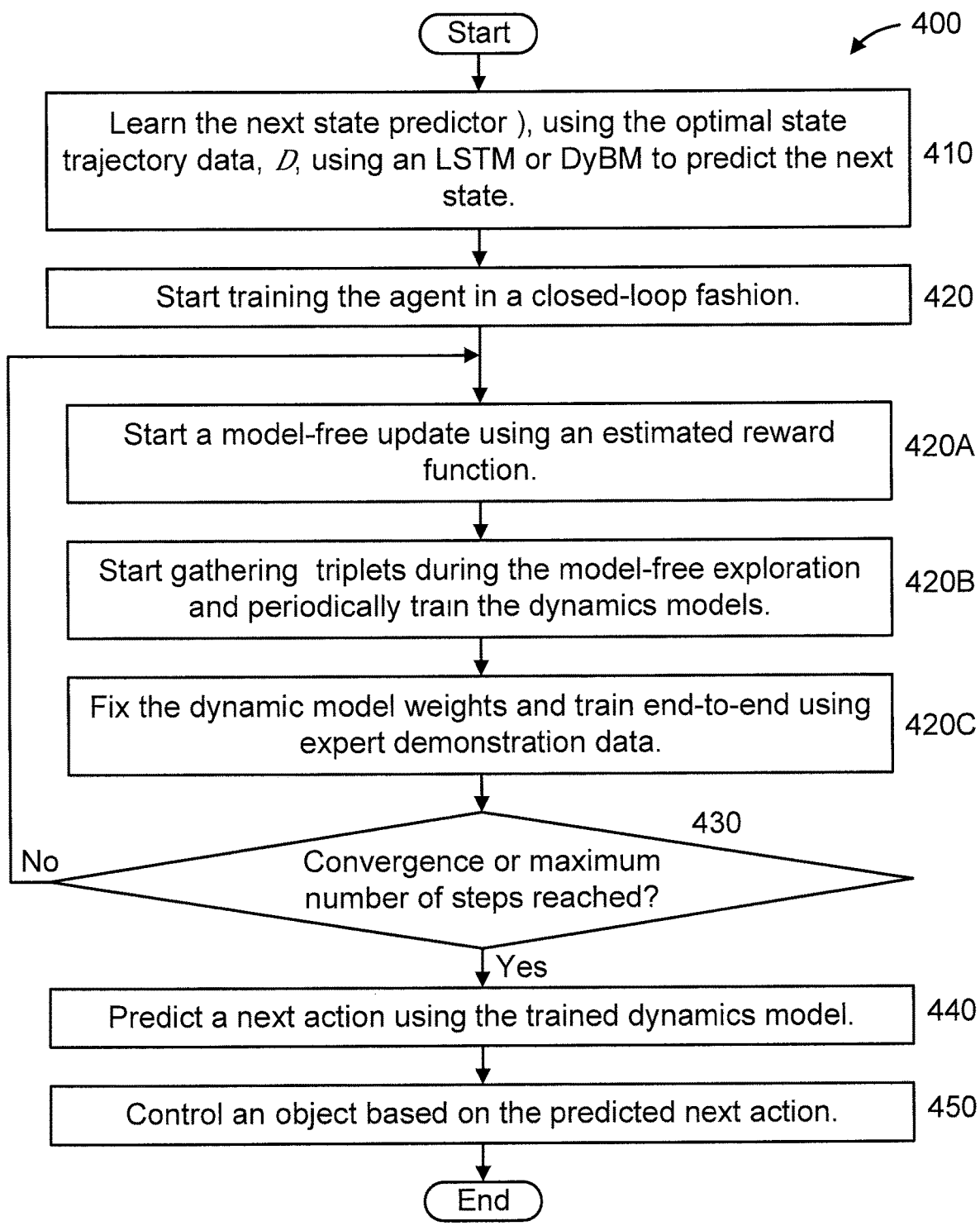
FIG. 4 is a flow diagram showing an exemplary method for learning an action policy from trajectories of expert states, in accordance with an embodiment of the present invention.

FIG. 4 is a flow diagram showing an exemplary method 400 for learning an action policy from trajectories of expert states, in accordance with an embodiment of the present invention.

The method 400 learns the optimal policy $p(a_t|s_t)$ from optimal demonstration data, D, consisting only of optimal states and not action, as follows:

$$D = \{(s_1^1, s_2^1, s_3^1 \ldots, s_T^1), \ldots, (s_1^n, s_1^n, s_1^n \ldots, s_T^n)\}$$

where s denotes a state, the numerator of a state s denotes the episode number, and the denominator of a state s denotes the step number in each episode.

At block 410, learn the next state predictor $p(s_{t+1}|s_t; \theta^*_g)$, using the optimal state trajectory data, D, using an LSTM or DyBM to predict the next state, as follows:

$$\theta^*_g = \underset{\theta_g}{\operatorname{argmin}} \left[ -\sum_{j=1}^{n} \sum_{t=1}^{T} \log p(s_{t+1}|s_t; \theta_g) \right]$$

where $p(s_{t+1}|s_t; \theta g)$ denotes the next state predictor model, with $\theta_g$ being the free-parameter of the model, T the number of time steps in each episode and n the number of episodes.

Figure 5:
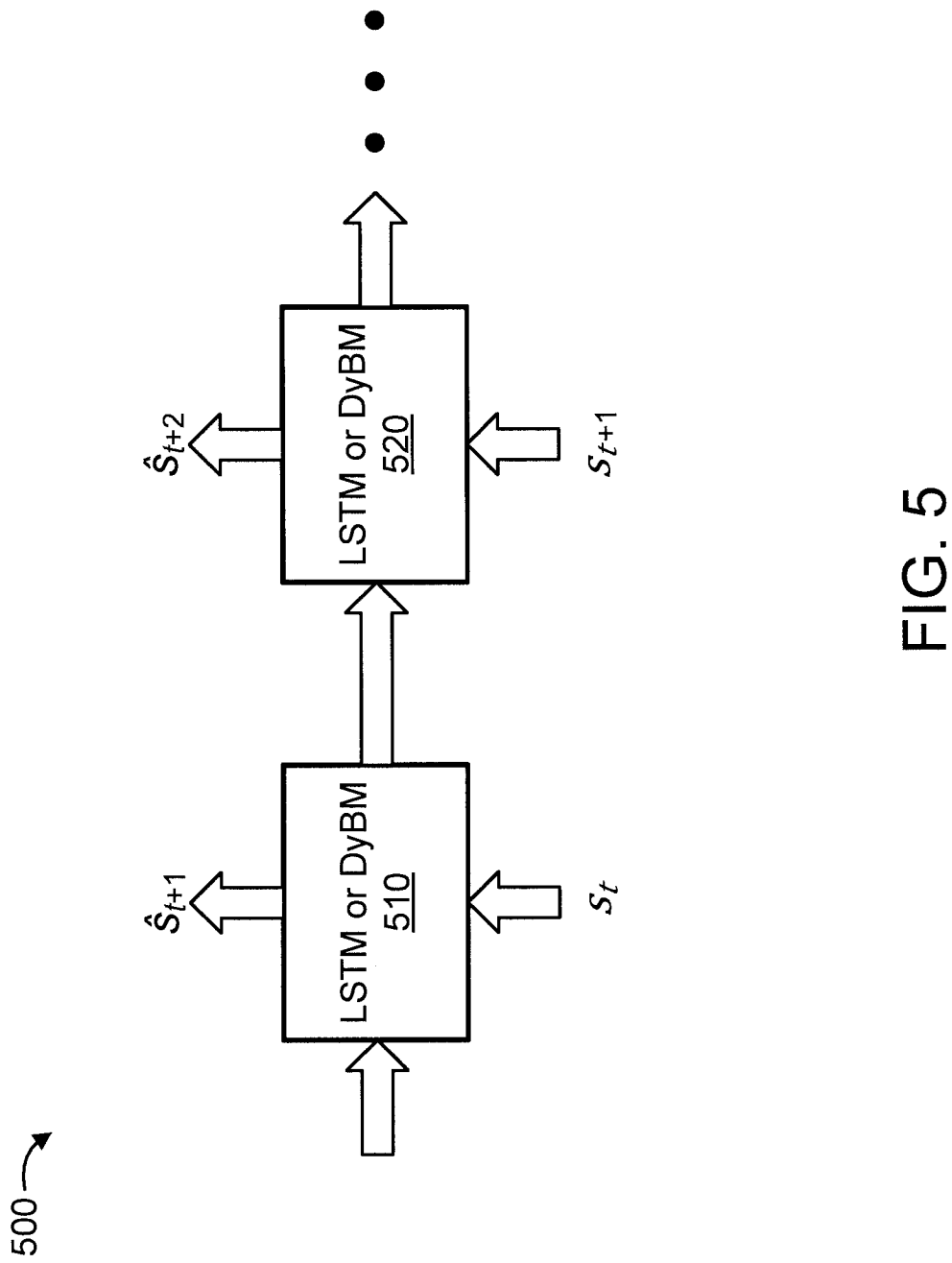
FIG. 5 is a block diagram showing an exemplary time series predictive model for the next state, in accordance with an embodiment of the present invention.

FIG. 5 is a block diagram showing an exemplary time series predictive model 500 for the next state, in accordance with an embodiment of the present invention. The time series predictive model 500 can be used to learn the next state predictor per block 410. The time series predictive model 500 can include a LSTM or DyBM for every next state to be predicted. Hence, from state $s_t$, next state $\hat{s}_{t+1}$ is predicted by LSTM or DyBM 510, and from state $s_{t+1}$, next state $\hat{s}_{t+2}$ is predicted by LSTM or DyBM 520.s Referring back to FIG. 4, at block 420, start training the agent in a closed-loop fashion.

In an embodiment, block 420 involves repeating the following sequence of steps 420A-420C until convergence or until the number of performed steps reaches a threshold (e.g., max_steps), as determined by block 430.

At block 420A, start a model-free update using an estimated reward function, $r_t$, computed as follows:

$$r_t = k_1 \exp\left(\frac{\|\hat{s}_{t+1} - s_{t+1}\|^2}{2\sigma^2} \bigg| S_t\right).$$

where $r_t$ is the estimated reward at the current time, $k_1$ is a constant, $S_t$ is the current state, $\hat{S}_{t+1}$ is the predicted next state, $S_{t+1}$ is the actual next state and $\sigma$ is the standard deviation of the model.

At block 420B, start gathering $(s_t, a_t, s_{t+1})$ triplets during the model-free exploration and periodically train the dynamics models as follows:

$$\theta^*_d = \underset{\theta_d}{\operatorname{argmin}} \left[ -\sum_{t=1}^{T} \log p(s_{t+1}|s_t, a_t; \theta_d) \right]$$

where $p(s_{t+1}|s_t, a_t; \theta_d)$ is the dynamics model and $\theta_d$ is the parameter of the model.

At block 420C, fix the dynamic model weights and train end-to-end using expert demonstration data.

At block 430, determine if the method has converged or if a maximum number of steps (max_steps_has been reached. If so, then proceed to block 440. Otherwise, return to block 420A.

At block 440, predict a next action using the trained dynamics model.

At block 450, control an object based on the predicted next action. The object can be controlled to perform the predicted next action itself or can be controlled to perform another action in response to the predicted next action. The object can be a vehicle, a robot, and so forth. In the case of the object being a vehicle, the predicted next action can involve obstacle avoidance maneuvers (braking, steering) being automatically performed (by a machine, and not the vehicle operator). Of course, other types of actions can be involved such as controlling a robot to perform a particular action (to avoid something, pick up something, move something, etc.). The preceding objects and actions are merely illustrative and, thus, other objects and action can also be involved, as readily appreciated by one of ordinary skill in the art given the teachings of the present invention presented herein, while maintaining the spirit of the present invention.

Figure 6:
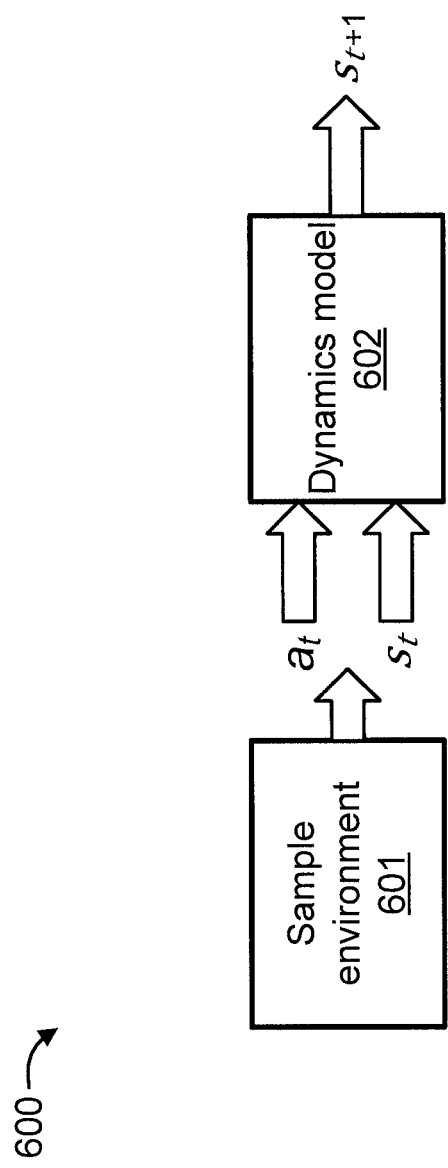
FIG. 6 is a block diagram showing an exemplary training of a forward model, in accordance with an embodiment of the present invention.

FIG. 6 is a block diagram showing an exemplary training 600 of a forward model, in accordance with an embodiment of the present invention.

The training 600 involves a sample environment 601 and a dynamics forward model 602. From the sample environment, action $a_t$ and state $s_t$ are obtained and input to the dynamics forward model 602 for training the model 602 to obtain next state $s_{t+1}$.

Figure 7:
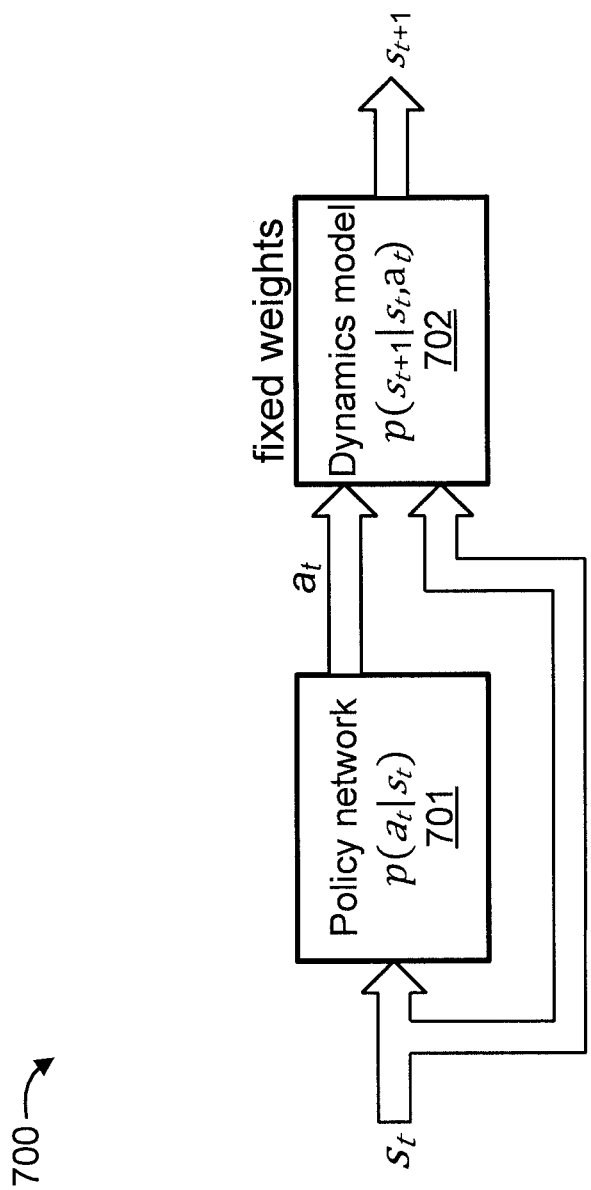
FIG. 7 is a block diagram showing an exemplary model-based policy obtained from expert data, in accordance with an embodiment of the present invention.

FIG. 7 is a block diagram showing an exemplary model-based policy 700 obtained from expert data, in accordance with an embodiment of the present invention.

The model-based policy 700 is obtained by inputting state $s_t$ into a policy network 701 and a (trained) dynamics model 702. The policy network 701 determines and outputs action $a_t$ from optimal policy $p(a_t|s_t)$. Responsive to inputs of state $s_t$ and action $a_t$, the dynamic model 702 uses fixed (that is, not updated) weights to output $s_{t+1}$.

Figure 8:
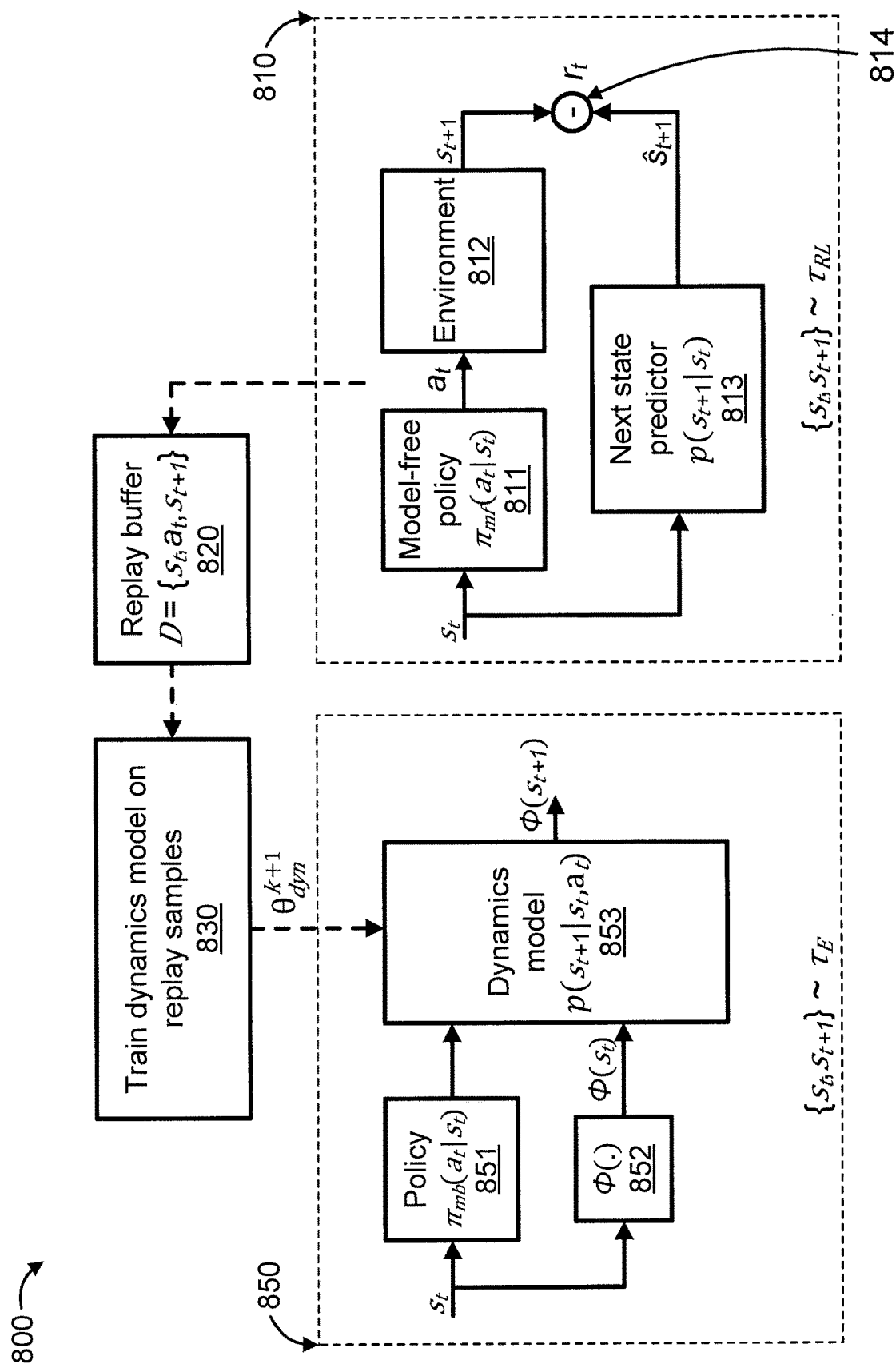
FIG. 8 is a high-level block diagram showing an exemplary combination of model-based policy learning and model-free inverse reinforcement learning, in accordance with an embodiment of the present invention.

FIG. 8 is a high-level block diagram showing an exemplary combination 800 of model-based policy learning 850 and model-free inverse reinforcement learning 810, in accordance with an embodiment of the present invention.

The model-free inverse reinforcement learning 810 involves a model-free policy ($\pi_{mf}(a_t|s_t)$) 811, an environment 812, a next state predictor ($p(s_{t+1}|s_t)$) 813, and an operator 814. The model-free policy 811 and the next state predictor 813 receive a state $s_t$, and the model-free policy 811 outputs an action $a_t$ (to the environment 812) while the next state predictor outputs next state $\hat{s}_{t+1}$ (to the operator 814). The operator 814 receives $s_{t+1}$ and $\hat{s}_{t+1}$ and outputs reward function $r_t$.

A replay buffer 820 samples the optimal demonstration data D to obtain reply samples.

A dynamics model ($p(s_{t+1}|s_t, a_t)$) 853 is trained 830 on the replay samples.

The model-based policy learning 850 involves an action policy ($\pi_{mb}(a_t|s_t)$) 851, a mapping operator $\phi(.)$ 852, and the dynamics model ($p(s_{t+1}|s_t, a_t)$) 853, thus providing a combination 899 of the dynamics model 853 and policy learning through the action policy 851 to obtain gradients with respect to an action when an expert action is missing. The action policy 851 and the mapping operator 852 receive a state $s_t$. The mapping operator 852 outputs $\phi(s_t)$ to the dynamics model 853. In further detail, the mapping operator 852 maps one or more measurements to a state. For example, for a state relating to a hole (that the agent could fall into), the mapping operator 852 may map a size (measurement) of the hole to the state. As another example, for a state relating to a hallway, the mapping operator 852 may map a length (measurement) of the hallway to the state. The dynamics model 853 also receives action $a_t$ from the policy 851 and $\theta_{dyn}^{k+1}$ from the training of the dynamics model 853. The dynamics model 853 outputs $\phi(s_{t+1})$.

The model-based policy learning 850 implements $\{s_t, s_{t+1}\} \sim \tau_E$, and the model-free inverse reinforcement learning 810 implements $\{s_t, a_t, s_{t+1}\} \sim \tau_{RL}$.

One advantage of combination 800 is that the combined closed loop model produces sample efficient learning compared to model-free alternatives. Another advantage of combination 800 is that since learning depends only on states only, transfer learning can be done between agents.

Hence, as noted above, as an inventive contribution, the present invention advantageously combines a dynamics model with policy learning to obtain policy gradients with respect to an action when an expert action is missing. Accordingly, an action policy can be learned using trajectories of expert states according to a supervised learning technique by back-propagating error gradients through the trained dynamics model. Once the dynamics model is fully learnt, it provides a differentiable model of the environment through which we can back propagate. Hence, even if only the expert agent's state trajectory is available during learning, we can infer the gradient signal with respect to the corresponding expert action by back-propagating through the learnt dynamics model. Assuming that the dynamics model learnt is accurate enough, this is equivalently to behavior cloning from expert state and action pairs.

Figure 9:
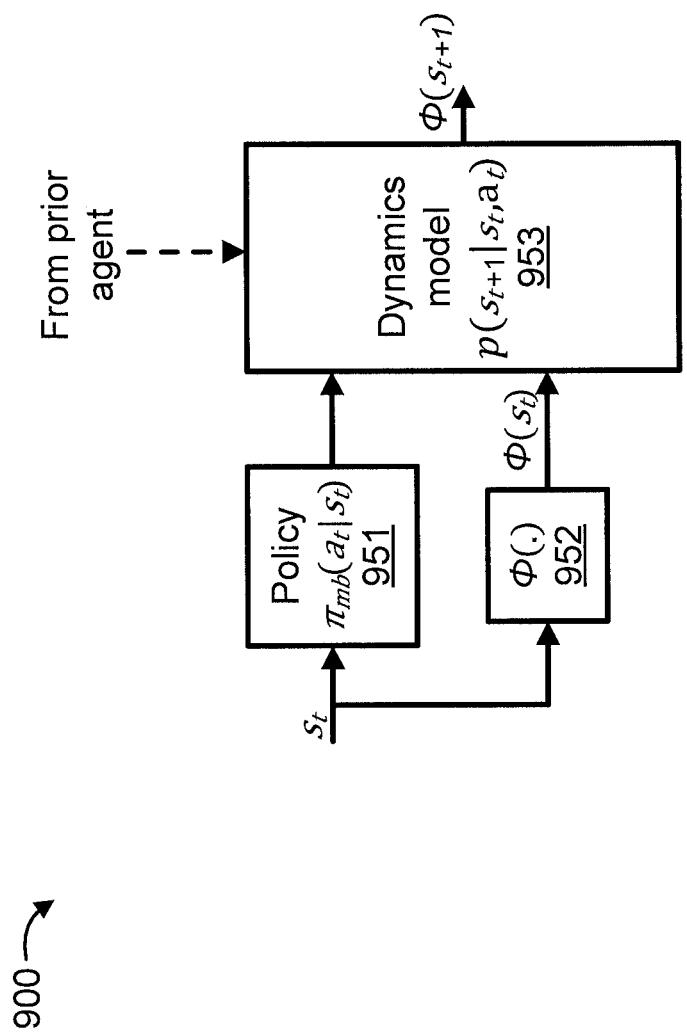
FIG. 9 is a high-level block diagram showing an exemplary method/system for one-shot imitation learning, in accordance with an embodiment of the present invention.

FIG. 9 is a high-level block diagram showing an exemplary method/system 900 for one-shot imitation learning, in accordance with an embodiment of the present invention.

The method/system 900 involves model-based policy learning 950 which, in turn, involves an action policy ($\pi_{mb}(a_t|s_t)$) 951, a mapping operator $\phi(.)$ 952, and the dynamics model ($p(s_{t+1}|s_t, a_t)$) 953. The previously trained dynamics model 953 can be used for one obstacle avoidance. The same dynamics model 953 can be used for end-to-end imitation learning.

Hence, dynamic model 953 takes information from a prior agent as an input, along with inputs provided from the outputs of the action policy 951 and operator 952.

A description will now be given regarding various exemplary advantages provided by the present invention.

One advantage is that the combined closed loop model produces sample efficient learning compared to model-free alternatives.

Another advantage is that the present invention can learn to imitate from only state information such as, for example, but not limited to, videos, joint angles, velocities, and so forth.

Still another advantage is that since learning depends only on states, transfer learning can be performed between agents.

It is to be appreciated that the present invention is not limited to providing solely the preceding advantages as one of ordinary skill in the art will contemplate these and various other advantages provided by the present invention, given the teachings of the present invention provided herein.

A description will now be given regarding various exemplary applications to which the present invention can be applied, in accordance with various embodiments of the present invention.

For example, the present invention can be applied to robotic applications (e.g., warehouse robots, manipulators, etc.), dialog applications (e.g., customer service, etc.), plant or data center optimization, gaming applications, pattern recognition (Optical Character Recognition (OCR), facial recognition, speech recognition, biometrics, etc.), and so forth. It is to be appreciated that the preceding applications are illustrative and that one of ordinary skill in the art will contemplate these and various other applications to which the present invention can be applied, based on the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
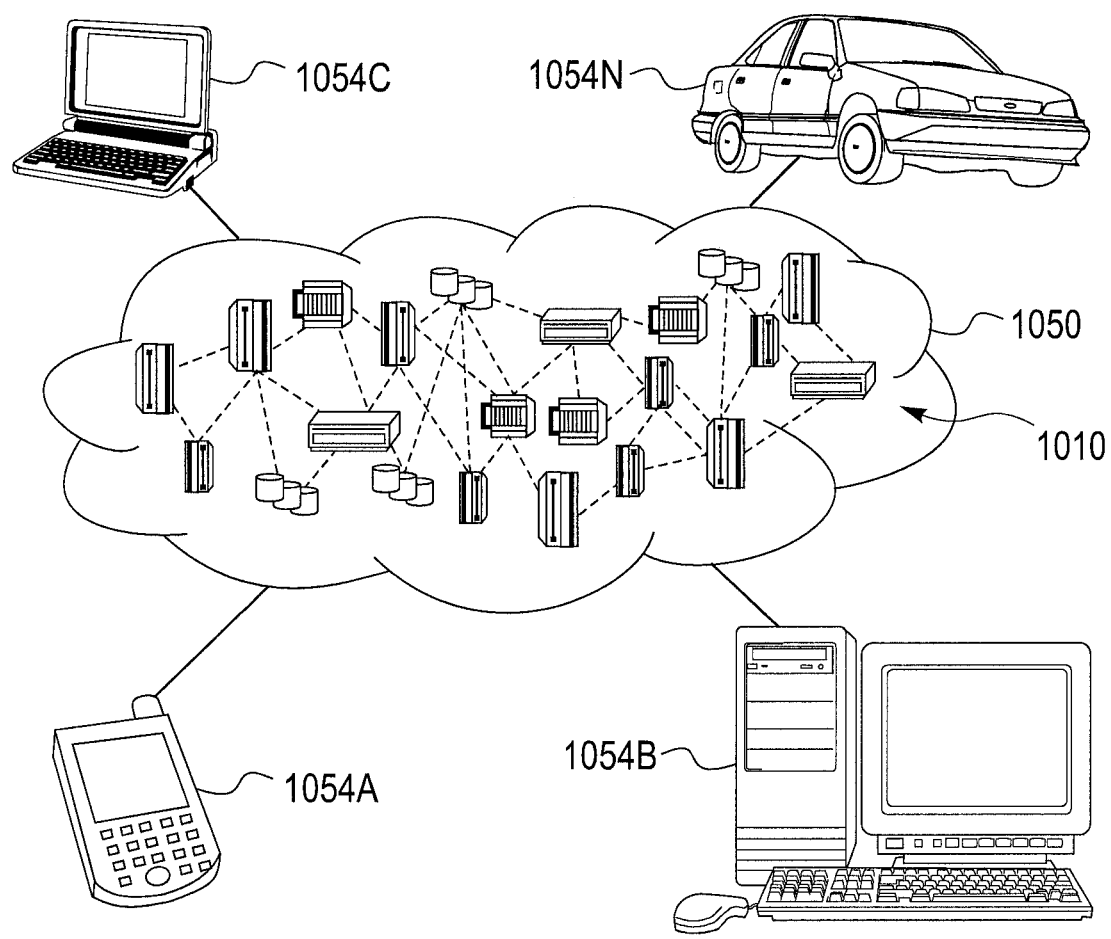
FIG. 10 is a block diagram showing an illustrative cloud computing environment having one or more cloud computing nodes with which local computing devices used by cloud consumers communicate in accordance with one embodiment.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 950 can communicate with any type of computerized device over any type of network and/or network addressable connection (e.g., using a web browser).

Figure 11:
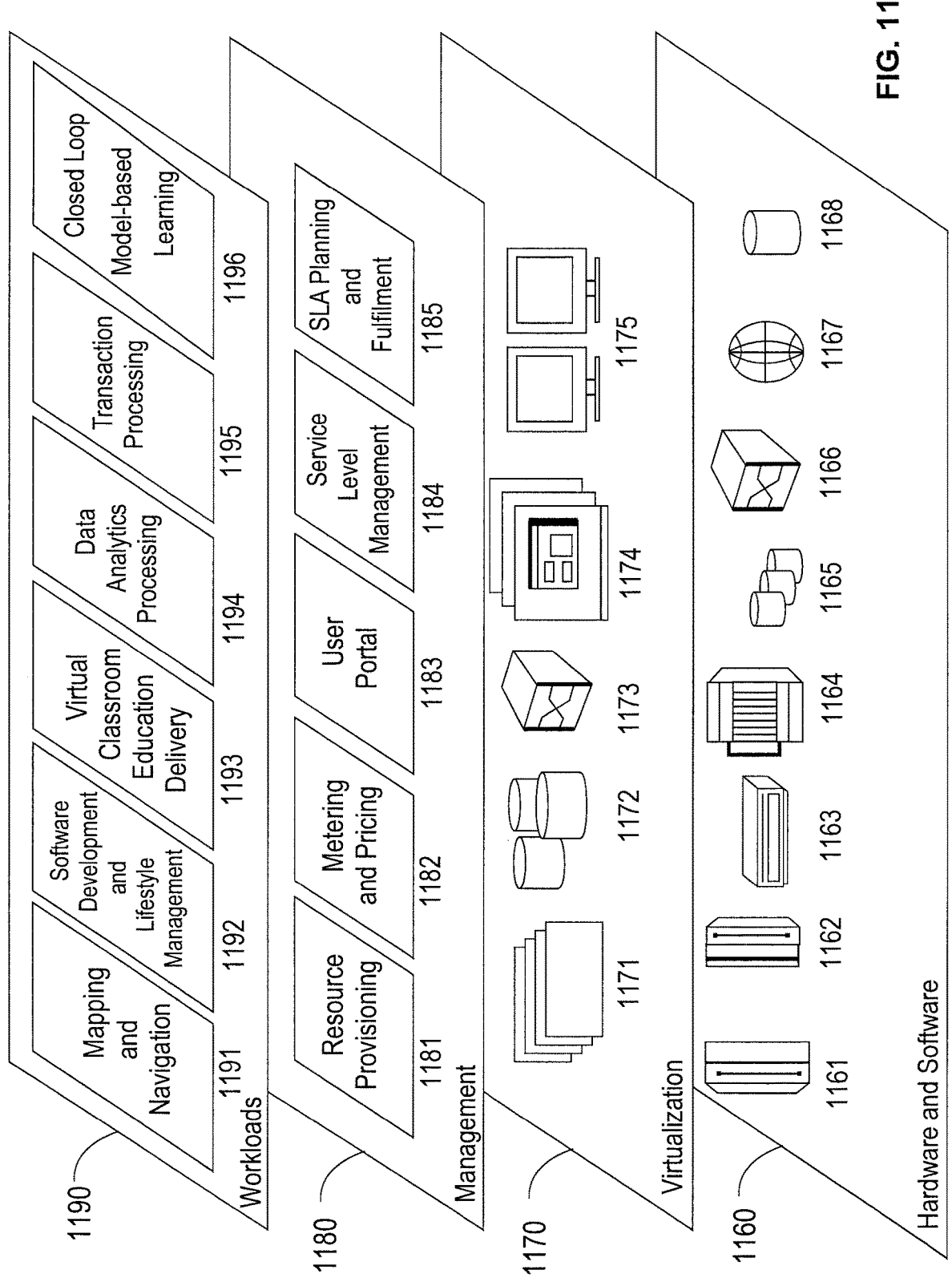
FIG. 11 is a block diagram showing a set of functional abstraction layers provided by a cloud computing environment in accordance with one embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized.

Examples of workloads and functions which may be provided from this layer include: mapping and navigation 1191; software development and lifecycle management 1192; virtual classroom education delivery 1193; data analytics processing 1194; transaction processing 1195; and closed-loop model-based action learning with model-free inverse Reinforcement Learning (RL) 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for learning an action policy, comprising:
    obtaining, by a processor performing model-free inverse reinforcement learning, environment dynamics including triplets of a state, an action, and a next state, wherein the state in each of the triplets is an expert state;
    training, by the processor using the environment dynamics as training data, a dynamics model which obtains a pair of the state and the action as an input and outputs, for each next state, state-transition probabilities; and
    learning, by the processor performing behavioral cloning, the action policy using trajectories of expert states according to a supervised learning technique by backpropagating error gradients through the trained dynamics model using an encoder-decoder network to learn the trajectories of expert states without action information,
    wherein weight parameters of the dynamics model are fixed in the learning of the action policy.

2. The computer-implemented method of claim 1, wherein said obtaining step comprises:
    learning a predictor which predicts a next state using the trajectories of the expert states; and
    performing the model-free inverse reinforcement learning using rewards estimated by using the predictor to sample the environment dynamics.

3. The computer-implemented method of claim 2, wherein the model-free inverse reinforcement learning is performed during an exploration stage of the method.

4. The computer-implemented method of claim 2, wherein the predictor is learned using a machine learning mechanism selected from a group consisting of a Long Short-Term Memory (LSTM) and a Dynamic Boltzmann Machine (DyBM).

5. The computer-implemented method of claim 4, wherein the machine learning mechanism comprises a plurality of machine learning mechanisms that, in turn, form a time-series predictive model for predicting the next state using the trajectories of the expert states.

6. The computer-implemented method of claim 1, wherein said training step uses closed-loop training to train the dynamics model.

7. The computer-implemented method of claim 1, wherein said obtaining step is performed during a model-free exploration stage of the method.

8. The computer-implemented method of claim 1, wherein the error gradients comprise policy gradients with respect to a corresponding action to the policy gradients and in an absence of an expert action corresponding to the policy gradients.

9. The computer-implemented method of claim 1, further comprising performing one obstacle avoidance using the trained dynamics model.

10. The computer-implemented method of claim 1, further comprising performing transfer learning between at least two agents using the trained dynamic model.

11. The computer-implemented method of claim 1, wherein said learning step is performed in an absence of expert actions corresponding to the expert states.

12. The computer-implemented method of claim 1, wherein the pair of the state and the action is obtained as the input to the dynamics model from a model-based policy map.

13. The computer-implemented method of claim 1, further comprising controlling a hardware object to perform an action involving movement responsive to the learned action policy.

14. A computer program product for learning an action policy, the computer program product comprising a non-transitory computer readable storage medium having program instructions embodied therewith, the program instructions executable by a computer to cause the computer to perform a method comprising:
    obtaining, by a processor of the computer performing model-free inverse reinforcement learning, environment dynamics including triplets of a state, an action, and a next state, wherein the state in each of the triplets is an expert state;
    training, by the processor using the environment dynamics as training data, a dynamics model which obtains a pair of the state and the action as an input and outputs, for each next state, state-transition probabilities; and
    learning, by the processor performing behavioral cloning, the action policy using trajectories of expert states according to a supervised learning technique by backpropagating error gradients through the trained dynamics model using an encoder-decoder network to learn the trajectories of expert states without action information, wherein weight parameters of the dynamics model are fixed in the learning of the action policy.

15. The computer program product of claim 14, wherein said obtaining step comprises:
    learning a predictor which predicts a next state using the trajectories of the expert states; and
    performing the model-free inverse reinforcement learning using rewards estimated by using the predictor to sample the environment dynamics.

16. A computer processing system for learning an action policy, comprising:
    a memory for storing program code; and
    a processor, operatively coupled to the memory, for running the program code to
        obtain, by performing model-free inverse reinforcement learning, environment dynamics including triplets of a state, an action, and a next state, wherein the state in each of the triplets is an expert state;
        train, using the environment dynamics as training data, a dynamics model which obtains a pair of the state and the action as an input and outputs, for each next state, state-transition probabilities; and
        learn, by performing behavioral cloning, the action policy using trajectories of expert states according to a supervised learning technique by back-propagating error gradients through the trained dynamics model using an encoder-decoder network to learn the trajectories of expert states without action information,
    wherein weight parameters of the dynamics model are fixed in the learning of the action policy.

17. The computer processing system of claim 16, wherein the environment dynamics are obtained by learning a predictor which predicts a next state using the trajectories of the expert states, and performing the model-free inverse reinforcement learning using rewards estimated by using the predictor to sample the environment dynamics.

18. A computer-implemented method for learning an action policy, comprising:
    learning, by a processor, a predictor which predicts a next state using trajectories of expert states; and
    performing, by the processor, model-free inverse reinforcement learning using rewards estimated by using the predictor to sample environment dynamics including triplets of a state, an action, and a next state, wherein the state in each of the triplets is an expert state;
    training, by the processor using the sampled environment dynamics as training data, a dynamics model which obtains a pair of the state and the action as an input and outputs, for each next state, state-transition probabilities to provide a trained dynamics model;
    learning, by the processor, the action policy using the trajectories of the expert states according to a supervised learning technique by back-propagating error gradients through the trained dynamics model using an encoder-decoder network to learn the trajectories of expert states without action information,
    wherein weight parameters of the dynamics model are fixed in the learning of the action policy.

19. A non-transitory article of manufacture tangibly embodying a computer readable program which when executed causes a computer to perform the steps of claim 18.

20. A computer processing system for learning an action policy, comprising:
    a memory for storing program code; and
    a processor, operatively coupled to the memory, for running the program code to
        learn a predictor which predicts a next state using trajectories of expert states; and
        perform model-free inverse reinforcement learning using rewards estimated by using the predictor to sample environment dynamics including triplets of a state, an action, and a next state, wherein the state in each of the triplets is an expert state;
        train, using the sampled environment dynamics as training data, a dynamics model which obtains a pair of the state and the action as an input and outputs, for each next state, state-transition probabilities to provide a trained dynamics mode;
        learn the action policy using the trajectories of the expert states according to a supervised learning technique by back-propagating error gradients through the trained dynamics model using an encoder-decoder network to learn the trajectories of expert states without action information,
    wherein weight parameters of the dynamics model are fixed in the learning of the action policy.

* * * * *